United States Patent

[11] 3,631,295

| [72] | Inventor | Derek Pooley |
| | | Abingdon, England |
| [21] | Appl. No. | 833,550 |
| [22] | Filed | June 16, 1969 |
| [45] | Patented | Dec. 28, 1971 |
| [73] | Assignee | United Kingdom Atomic Energy Authority |
| | | London, England |
| [32] | Priorities | June 21, 1968 |
| [33] | | Great Britain |
| [31] | | 29,845/68; |
| | | June 5, 1969, Great Britain, No. 28,605/69 |

[54] METHOD AND APPARATUS FOR STORING INFORMATION
21 Claims, 2 Drawing Figs.

[52] U.S. Cl...................................................... 315/13 ST,
315/10
[51] Int. Cl...................................................... H01j 29/50
[50] Field of Search.......................................... 315/10-13;
346/74 CR, 77; 313/92; 252/301.2 R

[56] References Cited
UNITED STATES PATENTS

| 3,362,017 | 1/1968 | Brahm............................ | 346/74 CRT |
| 3,389,382 | 6/1968 | Hart et al........................ | 346/74 CRT |
| 3,403,387 | 9/1968 | Boblett........................... | 346/74 CRT |
| 3,445,715 | 5/1969 | Dombeck........................ | 346/74 CRT |

Primary Examiner—Rodney D. Bennett, Jr.
Assistant Examiner—Brian L. Ribando
Attorney—Larson, Taylor and Hinds ABSTRACT: Information is stored, erased and read in an electron-luminescent phosphor by electron beams of respectively medium, high and low intensity. The medium intensity beam produces radiation damage in the phosphor which quenches its subsequent luminescence when irradiated with the reading low-intensity beam. The high-intensity beam heats the crystal and anneals out damaged areas thus restoring full (or nearly full) luminescence under the reading beam. In application to a storage tube the whole of the phosphor surface can be made to luminesce (with bright and quenched regions according to the information "written" in) by flooding the whole surface with ultraviolet light.

METHOD AND APPARATUS FOR STORING INFORMATION

BACKGROUND OF THE INVENTION

This invention relates to a method and apparatus for storing information.

Phosphors luminesce when excited by electrons but at the same time defects are produced which quench the luminescence. These defects can, however, be annealed by heating for a sufficient length of time. For example, the phosphor potassium iodide doped with thallium (KI/T1) luminesces efficiently at room temperature when excited by high-energy electrons, the light being emitted in a broad band peaked at 400 nm but can be damaged by such electrons to the extent of quenching the luminescence by a factor of more than 100. An electron beam can also be used to anneal the damage and return the phosphor to its original luminescent state.

According to the present invention there is provided a method of storing information comprising scanning a beam of radiation over the surface of a luminescent phosphor and modulating the energy of the beam of radiation between a first level which is sufficient to cause radiation damage to the phosphor such as to effect its luminescent properties and a second level which is sufficient to anneal the said radiation damage, so as to provide a distribution of damaged areas of phosphor representative of the information to be stored.

While it is preferred that the phosphor is an electron-luminescent phosphor, the invention includes a method of storing information by forming regions of varying degrees of radiation damage over the surface of a luminescent phosphor. In this case, it is important that the phosphor is such that luminescence, which may be excited by irradiating the phosphor with ultraviolet light, is quenched in regions that have been subject to radiation damage.

In applying the invention to the storage of binary digital information very high-speed reading and writing is normally an essential requirement and a feature of the invention resides in the appreciation that two degrees of luminescence sufficiently distinct to be read at high speed by a scanning electron beam can be written by the processes of electron radiation damage and electron heating and that both, particularly the latter, can be achieved at a writing time capable of meeting practical requirements. It can be shown that a writing time of the order of 1 $\mu$sec. per bit is possible.

When damaged by radiation KI/T1 requires to be heated above a few hundred degrees Centigrade if the damage is to be annealed in less than several seconds. Thus reduction of the light output pulse by a large factor for a given read pulse, which will be called writing from 1 → 0, may be performed by a pulsed beam of electrons having an energy and power per pulse such as not to raise the temperature of the affected volume of phosphor above a few hundred degrees Centigrade, thereby producing optimum radiation damage and minimum annealing. It can be shown, for example, that a dose of 500 Jcm$^{-3}$ can be deposited in KI/T1 by a 20 kv., 6.4 mW beam within a volume represented by a hemisphere of 2 $\mu$m diameter in one-fifth $\mu$sec. without exceeding the annealing temperature and yet be of a sufficient radiation intensity to produce the necessary damage. Writing from 0 → 1 may be performed also by a pulsed beam of electrons, preferably from the same source, but at a higher power level per pulse so as to raise the temperature of the affected volume of phosphor (that damaged in the 1 → 0 writing) to near the melting point of the phosphor.

According to a further feature of the invention the speed of the anneal is increased and the 0 → 1 writing time reduced to a low figure by using a pulse of an energy sufficient to anneal only about one-half of the defects. It can be shown that the time taken is thus reduced by a factor of about one one-hundredth of that required to remove 99 percent of the defects and that the change in luminescence is nevertheless adequate to enable the two states to be distinguished.

Where cathode-luminescent phosphor is employed, reading may be effected by a relatively low-intensity pulsed beam of electrons (also preferably from the same source) to produce from the damaged or annealed regions a small or large photon pulse respectively and from which, by means of a photocathode, a corresponding current pulse is derived.

If, for example, an appropriate photoluminescent phosphor is used, radiation damage, and damage annealing may be achieved with electron beams for writing 1 → 0 and 0 → 1 as described above, but reading then would have to be performed with a luminescence exciting beam, such as ultraviolet light.

Use of cathode-luminescent phosphor and reading with a low-intensity electron beam is preferred because the same electron beam source can then be employed for reading and writing.

Yet further features of the invention reside in apparatus for carrying out the foregoing methods.

The apparatus may comprise an electron gun and associated beam deflection system, target means comprising a wafer of luminescent phosphor capable of being damaged and annealed by electrons from said gun, means for pulsing the electron gun to produce a beam of electrons having various current values such as to damage or anneal the phosphor, means for directing a beam of exciting radiation at the phosphor target and a photocathode for deriving readout signals from the phosphor.

Preferably the phosphor is electron-luminescent and reading is effected by exciting luminescence with a low-intensity electron beam from the gun.

The gun and target are within one vacuum envelope but the photocathode is preferably in a separate envelope and may be part of a conventional photomultiplier.

The phosphor may be of the order of 1 mm. thick and of an area depending on the number of bits to be stored and the chosen resolution. It may consist of a single crystal or be fabricated as a polycrystalline compact. Annealing can be achieved without raising the phosphor above its melting point but a faster anneal can be obtained, if necessary, by partial melting of the volume corresponding to each bit. This can be permitted by providing a thin high melting point metal film on the surface of the phosphor upon which the electrons are incident. This will retain any molten phosphor and has the added advantage of increasing the photon output by reflection and of minimizing any undesirable electrostatic effects.

However, it has been found that annealing can be achieved at 400°–500° C. despite the fact that at this temperature annealing would not be expected by a purely thermal mechanism. It is believed that annealing is enhanced by increased defect mobility in the radiation field.

The invention also provides apparatus for the combined storage and display of information comprising a surface coated with a luminescent phosphor, the luminescence characteristics of which can be varied by damage due to radiation of a first energy level and restored by annealing of the damage by radiation of a second energy level, means for forming regions of radiation damage of the phosphor over the surface, means for exciting luminescence of the phosphor, and means for annealing the phosphor to erase stored information.

Preferably the phosphor is coated onto the screen surface of a cathode-ray tube, for example, by coating with powdered phosphor and baking.

The electron beam equipment of the cathode-ray tube may then be adapted to effect controlled radiation damage or damage annealing of the phosphor surface. However, it will be appreciated that by, for example, rapidly scanning an electron-luminescent phosphor surface with a beam of electrons of relatively low intensity, that is such as will excite luminescence but not of sufficient intensity to cause radiation damage, those regions of the surface where luminescence has been quenched by radiation damage will contrast with those regions where luminescence has not been quenched.

Thus, by appropriate control of the writing electron beam, any desired pattern may be prepared upon the screen for subsequent display.

While it is possible for the display to be excited by a scanning cathode beam, a further phenomenon of electron-luminescent phosphors such as potassium iodide doped with thallium is that luminescence may be excited by irradiating the phosphor with ultraviolet light. Furthermore, the luminescence so produced is subject to quenching where radiation damage, produced by the writing electron beam, is present. Similarly the luminescence is not so quenched where there is no radiation damage or where radiation damage has been, at least to a substantial extent (of the order of one-half or more), annealed out.

Thus a preferred arrangement according to the invention comprises means for flooding the phosphor coated surface with ultraviolet light. With a cathode-ray tube arrangement, this is conveniently secured by a window in the side of the tube and an ultraviolet lamp positioned to shine onto the screen through the window.

The phosphor may be photoluminescent, as distinct from cathode luminescent, provided radiation damage produced in the photoluminescent phosphor by electron beam bombardment produces localized quenching of the luminescence upon subsequent exciting irradiation, for example with ultraviolet light.

DESCRIPTION OF PREFERRED EMBODIMENTS

Figure 1:
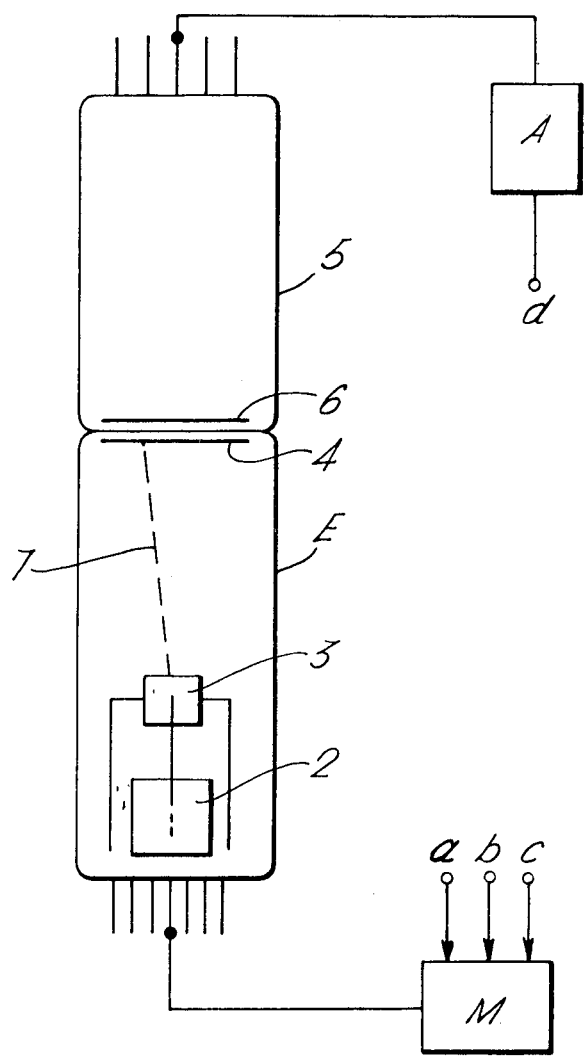
Figure 2:
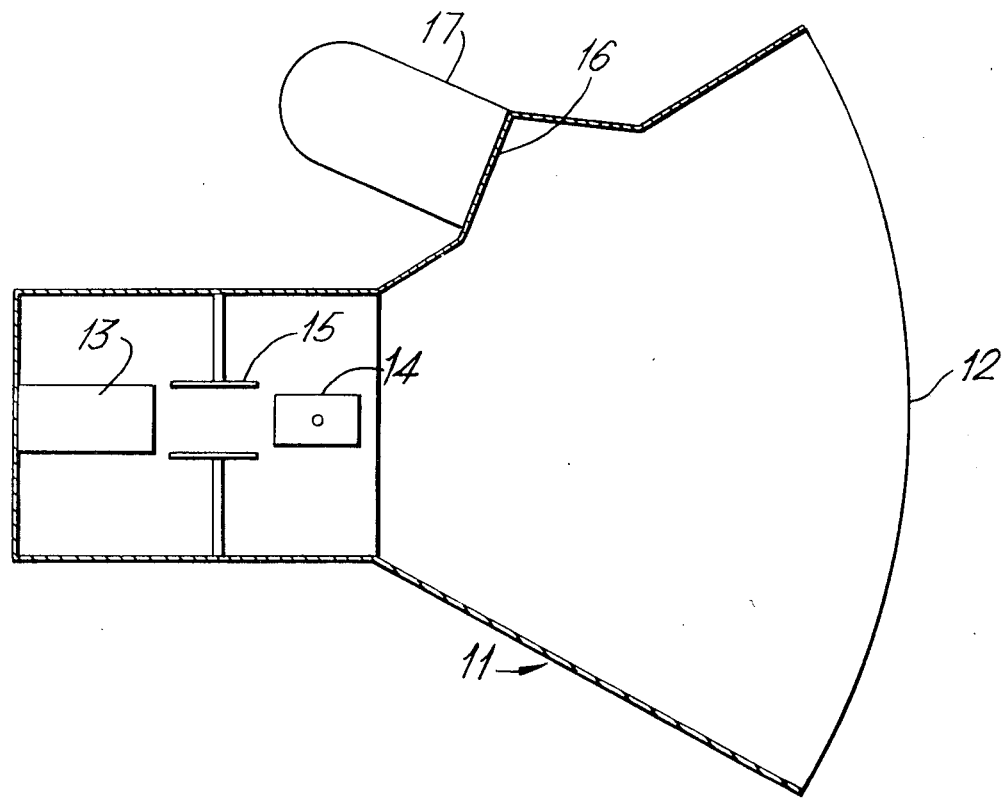

In order to enable the nature of the invention to be more readily understood reference is directed to the accompanying drawings in which:

FIG. 1 is a diagrammatic illustration by way of example of one practical embodiment of the invention capable of storing $10^7$ bits of digital information, and FIG. 2 is a diagrammatic sectional view of another embodiment of the invention for the combined storage and display of information.

In FIG. 1, E is a vacuum envelope containing a miniature electron gun unit 2 and X and Y deflector electrode system 3. The target of the gun is a phosphor in the form of wafer 4 of potassium iodide doped with thallium (KI/T1) 6 mm. square and about 1 mm. thick mounted against an end face of the envelope E. The thallium concentration throughout the phosphor is kept within the range one one-hundredth percent to one-tenth percent by volume to ensure substantially uniform luminosity. Closely abutting said face is a miniature photomultiplier tube 5 comprising a CsSbO photocathode 6 which has a spectral response which matches the emission of the said phosphor.

The gun 2 is designed to emit a 15 kv. electron beam 7 having a diameter at the phosphor of about 2 $\mu$m and current of three different values, viz 1, 200 and 500 nA. The penetration depth of a 15 kv. beam in KI/T1 is about 1 $\mu$m so that a roughly hemispherical volume of that radius is affected irrespective of the current. The beam current is controlled at these values by a modulator M depending upon whether reading pulses are applied to terminal $a$ or 1 → 0 writing pulses are applied to terminal $b$ or 0 → 1 writing pulses are applied to terminal $c$ respectively.

The deflector electrode system 3 and the associated electronic control equipment (not shown) is required to steer the 2 $\mu$m diameter beam 7 to a linear accuracy at the phosphor 4 of approximately 1 in 3,000 in order to read and write $10^7$ bits on the 6 mm. phosphor 4.

The signal output of the photomultiplier 5 is passed through a suitable shaping and amplifying unit A to a readout terminal $d$.

The phosphor 4 is preferably quenched over the whole of its surface prior to assembly so as to be in the 0 state. In operation, with the beam steering system causing the beam to scan the phosphor at a line spacing of 2 $\mu$m and pausing along each line for one-fifth $\mu$sec. every 2 $\mu$m to write and store information, 0 or 1 signals, as the case may be, are fed to terminals $b$ or $c$ respectively. 0 signals applied to terminal $b$ switch the beam current to 200 nA which, in this first operation, will have no effect since the phosphor is wholly in the 0 state. 1 signals applied at terminal $c$ switch the beam current to 500 nA which is sufficient to anneal the radiation damage at each such writing position. Subsequently 0 signals applied to terminal $b$ will cause radiation damage and reduce the luminescence at any writing position that has been annealed in the 0 → 1 writing step. During these writing sequences the photomultiplier 5 is switched off.

For readout, the photomultiplier 5 is switched on and a continuous succession of pulses is applied to terminal $a$ which switches the beam current to 1 nA. This value of beam current is sufficient to excite each discrete volume of phosphor to a high or low intensity of luminescence and for a corresponding electrical signal of high or low amplitude to be derived from the multiplier. The luminescence lifetime in the range 0°–200° C. is essentially constant at 300 nA.

For ease of understanding the above operations of writing and reading have been described with respect to sequential access. The apparatus of this example however, allows for random access.

A highly advantageous arrangement may comprise a single electronic control apparatus connected to steer a plurality of stores, such as the above-described embodiment, there being one store for each bit and the whole arrangement being capable of operating on all the bits of a word simultaneously.

It will be appreciated that the apparatus of the foregoing example may be used for analogue storage since the luminescent intensity at a given radiation dose is a substantially linear function of beam current, and at a given current, is an expotentially decreasing function of dose. The impurity concentration, however, becomes more important in such an application and a polycrystalline compact made by the pressed disc technique lends itself more readily to the attainment of sufficiently uniform impurity concentration in the phosphor.

In the embodiment illustrated in FIG. 2, a cathode-ray tube 11 has its screen 12 internally coated with potassium iodide doped with thallium. The coating technique in which powdered phosphor is baked onto the surface is conventional for the coating of cathode-ray tube screens with phosphors. The thickness of the phosphor layer should be such as is penetrated almost, but not quite, completely by the electron beams with which it is bombarded.

Within the vacuum envelope provided by the tube 11 is mounted electron gun 13 and X and Y deflection electrodes 14, 15.

The electron gun 13 may operate similarly to that described with reference to FIG. 1. Thus, if a 20 $\mu$m spot size is convenient for writing in the information for display and the electron beam is accelerated through 15 kv., then beam currents of 300 nA and 2 $\mu$A will be required.

With the beam at 300 nA, regions of the screen 12 subjected to irradiation by the beam for the writing time of the order of 10 $\mu$sec. will be radiation damaged. With the beam at 2 $\mu$A regions of the screen 12 subjected to irradiation by the beam for the erasing time of the order of 10 $\mu$sec. will be adequately annealed for luminescing brightly in comparison with the quenched regions.

In the side of the cathode-ray tube 11 is formed a window 16 adjacent which is mounted an ultraviolet light source shown diagrammatically at 17.

If the screen 12 is flooded with ultraviolet light, the information stored on the screen is displayed by virtue of the contrast in luminescence between damaged and nondamaged or annealed regions.

Information stored in the screen in this way has a long lifetime and may be repeatedly displayed by ultraviolet flooding. Certain parts of the display information can be updated without destroying other parts.

The invention is not restricted to the details of the foregoing examples. For instance while potassium iodide doped with thallium is the preferred phosphor, other suitable phosphors may be employed. The requirements are that the phosphor should be luminescent, should be efficiently damaged by electron irradiation and should be efficiently annealed by a high-density beam. In connection with the damage process, it is noteworthy that damage can also be produced by, for example, X-rays or protons. However, electron beams are employed in the foregoing examples because of the greater ease of producing, focusing and controlling electrons.

Whilst the more intense electron beam is preferred for annealing out the damaged regions, other techniques, for example using a laser beam, may be employed if desirable and appropriate to the functions required.

I claim:

1. A method of storing information comprising scanning a beam of radiation over the surface of a luminescent phosphor and modulating the energy of the beam of radiation between a first level which is sufficient to cause radiation damage to the phosphor such as to effect its luminescent properties and a second level which is sufficient to anneal the said radiation damage, so as to provide a distribution of damaged areas of phosphor representative of the information to be stored.

2. A method of storing information according to claim 1 wherein the phosphor is cathodo-luminescent.

3. A method of storing information according to claim 1 wherein the beam of radiation comprises a beam of electrons.

4. A method of storing information according to claim 1 wherein the first and second levels are of constant amplitude and the information is stored in binary digital form.

5. A method of storing information according to claim 4 wherein said first level produces a 0 state of luminescence and said second level produces a 1 state of luminescence, and wherein the process of writing from a 1 state to a 0 state is performed by a pulsed beam of electrons each pulse having an energy content such as to raise the temperature of a volume of phosphor effected by the electrons in the pulse to a value sufficient to produce optimum radiation damage and minimum anneal.

6. A method of storing information according to claim 5 wherein the process of writing from a 0 state to a 1 state is performed by a pulsed beam of electrons each pulse having an energy content sufficient to raise the temperature of the affected volume of phosphor to a value sufficient to anneal radiation damage caused by the process of writing a 1 state to a 0 state.

7. A method of storing information according to claim 6 wherein each pulse for writing from a 0 state to a 1 state has an energy content sufficient to anneal a fraction not less than one-half of the damage defects caused by the process of writing from a 1 state to a 0 state.

8. A method of storing information according to claim 2 wherein reading of stored information is effected by scanning over the surface of the phosphor a pulsed beam of electrons having an energy content low compared with that of the writing beam used to write from a 1 state to a 0 state so as to produce from the damaged or annealed regions of the phosphor a smaller or larger photon pulse respectively.

9. A method of storing information according to claim 1 wherein stored information is erased by scanning the beam of radiation over the surface of the phosphor at the said second energy level so as to anneal the surface of the phosphor.

10. Apparatus for the storage, and erasure of information comprising an electron gun and associated beam deflection system, target means comprising a wafer of luminescent phosphor capable of being damaged and annealed by electrons from said gun, means for pulsing the electron gun to produce a beam of electrons having various current values such as to damage or anneal the phosphor, means for directing a beam of exciting radiation at the phosphor target, and a photocathode for deriving readout signals from the phosphor.

11. Apparatus according to claim 10 wherein the phosphor is cathodo-luminescent and the phosphor is excited to luminesce by means of a low-intensity electron beam from said gun.

12. Apparatus according to claim 11 wherein said gun and target means are positioned in one vacuum envelope while the photocathode is positioned in a separate envelope.

13. Apparatus according to claim 11 wherein the thickness of the phosphor is approximately 1 mm.

14. Apparatus according to claim 11 wherein the phosphor is provided with a surface layer of high melting point material of a thickness insufficient to inhibit the action of the electron beam.

15. Apparatus for the combined storage, display and erasure of information comprising a surface coated with a luminescent phosphor, the luminescent characteristics of which can be varied by damage due to radiation of a first energy level and restored by annealing of the damage by radiation of a second energy level, means for forming regions of radiation damage of the phosphor over the surface, means for exciting luminescence of the phosphor, and means for annealing the phosphor to erase stored information.

16. Apparatus according to claim 15 wherein the phosphor is a cathodo-luminescent phosphor.

17. Apparatus according to claim 16 wherein the phosphor is coated onto the screen surface of a cathode-ray tube.

18. Apparatus according to claim 17 including means adapted to activate the electron beam producing and deflecting system of the cathode-ray tube to effect controlled radiation damage or annealing of the phosphor surface.

19. Apparatus according to claim 18 wherein the electron beam producing and deflecting system-activating means is adapted to display the information stored on the screen by scanning the screen at a low intensity such that the phosphor is not damaged.

20. Apparatus according to claim 16 wherein there is provided means for flooding the phosphor coated surface with ultraviolet light.

21. Apparatus as claimed in claim 20 wherein the cathode-ray tube is provided with a window and an ultraviolet lamp positioned to shine onto the screen through the window.

* * * * *